United States Patent
Sauer et al.

(10) Patent No.: US 7,665,066 B2
(45) Date of Patent: Feb. 16, 2010

(54) METHOD FOR DETERMINING AND RECORDING SYSTEM INFORMATION AND FUNCTION IN DISTRIBUTED PARALLEL COMPONENT BASED SOFTWARE SYSTEMS

(75) Inventors: Horst Sauer, München (DE); Stefan Ungerhofer, Kirchbichl (AT)

(73) Assignee: Siemens Aktiengesellschaft, Munich (DE)

( * ) Notice: Subject to any disclaimer, the term of this patent is extended or adjusted under 35 U.S.C. 154(b) by 905 days.

(21) Appl. No.: 10/474,872

(22) PCT Filed: Apr. 8, 2002

(86) PCT No.: PCT/DE02/01278

§ 371 (c)(1),
(2), (4) Date: May 11, 2004

(87) PCT Pub. No.: WO02/084491

PCT Pub. Date: Oct. 24, 2002

(65) Prior Publication Data

US 2004/0181710 A1    Sep. 16, 2004

(30) Foreign Application Priority Data

Apr. 12, 2001   (DE) ................................ 101 18 502

(51) Int. Cl.
  *G06F 9/45*   (2006.01)
(52) U.S. Cl. ..................................... 717/124
(58) Field of Classification Search .................. 717/124
  See application file for complete search history.

(56) References Cited

U.S. PATENT DOCUMENTS

| | | | |
|---|---|---|---|
| 5,307,498 A | | 4/1994 | Eisen et al. |
| 5,371,746 A | * | 12/1994 | Yamashita et al. ............ 714/38 |
| 5,790,858 A | * | 8/1998 | Vogel ......................... 717/130 |
| 5,933,639 A | * | 8/1999 | Meier et al. .................. 717/129 |
| 6,353,924 B1 | * | 3/2002 | Ayers et al. .................. 717/128 |
| 6,742,178 B1 | * | 5/2004 | Berry et al. .................. 717/130 |

FOREIGN PATENT DOCUMENTS

| | | |
|---|---|---|
| DE | 43 23 787 A1 | 1/1995 |
| EP | 0 470 322 A1 | 2/1992 |

(Continued)

OTHER PUBLICATIONS

Debugging distributed implementations of modal process systems by Ken Hines and Gaetano Borriello Languages, Compilers, and Tools for Embedded Systems ACM SIGPLAN Workshop LCTES'98 Montreal, Canada, Jun. 19-20, 1998 Proceedings pp. 98-107.*

(Continued)

*Primary Examiner*—John Chavis
(74) *Attorney, Agent, or Firm*—Harness, Dickey & Pierce, P.L.C.

(57) ABSTRACT

A universal test or monitoring of distributed, parallel component based software systems can be achieved, which minimally affects the system for monitoring, automatically provides the correct system components with inspection instruments, a semantic connection of communication reports between each transmitter and receiver and a logical event sequence without synchronized clock time for the individual components of the distributed system in the form of an evaluation model and can find application on any form of evaluation tool.

14 Claims, 6 Drawing Sheets

FOREIGN PATENT DOCUMENTS

| | | | |
|---|---|---|---|
| JP | 5100895 | A | 4/1993 |
| JP | 5233359 | A | 9/1993 |
| JP | 09-330233 | A | 12/1997 |
| JP | 10-214203 | A | 8/1998 |
| JP | 10269105 | A | 10/1998 |
| JP | 2000507724 | T | 6/2000 |
| JP | 2000315198 | A | 11/2000 |
| WO | WO 00/55733 | | 9/2000 |

OTHER PUBLICATIONS

Jason Pritchard, "The Dominance of COM and COBRA", Chapter 2, Addison-Wesley, 1999, pp. 17-25.

Hines K and Borriello G: "Debugging distributed implementations of modal process systems", Proceedings of ACM SIGPLAN. Workshop on Languages, Compilers and Tools for Embedded Systems, XX, XX, Jun. 1998, pp. 1-7, XP002188025.

Consens M P et al: "Visualizing and Querying Distributed Event Traces with Hy+" Applications of Databases. International Conference, XX, XX, Jun. 1994, pp. 123-141, XP002200870.

Kimelman D et al: "On-The-Fly Topological Sort-A Basis for Interactive Debugging and Live Visualization of Parallel Programs" ACM SIGPLAN Notices, Association for Computing Machinery, New York, US, Bd. 28, Nr. 12, Dec. 1, 1993, pp. 12-20, XP000431364 ISSN: 0362-1340.

Auguston M: "Building Program Behavior Models" Proceedings European Conference on Artificial Intelligence, Chichester, GB, Aug. 1998, pp. 19-26, XP002200871.

Zusammenfassung, Seite 4, Spalte 1, Zeile 8-Zeile 21, Seite 4, Spalte 2, letzter Absatz-Seite 5, Spalte 1, Absatz 9.

"Introduction fo Java 2 Enterprise Edition—(1)" from Java Press, published by K.K. Gijutsu Hyoronsha, Feb. 1, 2000, vol. 10, pp. 78-85.

Partial English language translation of Japanese Patent Office Action dated Apr. 2008.

Translation of a Japanese Office Action mailed Apr. 24, 2009.

* cited by examiner

METHOD FOR DETERMINING AND RECORDING SYSTEM INFORMATION AND FUNCTION IN DISTRIBUTED PARALLEL COMPONENT BASED SOFTWARE SYSTEMS

This application is the national phase under 35 U.S.C. § 371 of PCT International Application No. PCT/DE02/01278 which has an International filing date of Apr. 8, 2002, which designated the United States of America and which claims priority on German Patent Application number DE 101 18 502.2 filed Apr. 12, 2001, the entire contents of which are hereby incorporated herein by reference.

FIELD OF THE INVENTION

The invention generally relates to a method for tracing, that is for tracking, sequences of activities. Preferably, this is done via event messages from a system which is to be observed, where the system which is to be observed may have several processes, tasks or threads and can execute on different devices.

BACKGROUND OF THE INVENTION

Distributed parallel-running component-based software systems, such as for example Microsoft's COM, CORBA or the Enterprise Java Beans systems, are for example presented briefly in the book by Jason Pritchard with the title "COM and CORBA Side by Side Architectures, Strategies and Implementations, Addison-Wesley, 1999, pages 17 to 25.

In all phases of their development, that is during the implementation, integration and testing of software systems, as well as in use such as during their commissioning and operational monitoring, there is a need to be able to inspect and evaluate system run time data for the purposes of analysis, fault localization or to demonstrate the correctness of the software. This data covers system states, such as for example internal variables, and data about communication activities and events including their time sequence.

Until now, the following have been the familiar methods of tracing:

a) A debugger, under the control of which every system process is executed and which permits the interactive setting of breakpoints and the inspection of debugging data, that is the contents of local and global variables, when a breakpoint is reached. However, it is specifically the case in distributed parallel-running systems that this solution approach only permits local inspection, which can only with difficulty be used to make statements about the overall system. Apart from which, the system behavior is sensitive to disruption or even crashing if individual components/processes are halted interactively.

b) An additional item of debugging information in the program code, i.e. the names of objects, variables etc. plus details concerned with the mapping of source code lines to machine code, for further analysis, with this debugging information generally being used for error analysis after system crashes, that is for a post mortem analysis. This approach again offers a view of the system which is essentially only a local one. With post mortem analyses it is often not possible—using only a knowledge of the final state of the system—to draw any conclusion about the actual cause of the error. Furthermore, particularly in the case of small embedded systems with limited resources, the software should be supplied with no debug data, to keep it as compact as possible.

c) Pre-instrumented code, that is supplementary program code which is a permanent part of the finished system, and which is activated when required to generate relevant system data. This approach too is often hardly usable on small systems due to resource scarcity, or the instrumentation may be restricted to some parts only of the system. The instrumentation is static, and cannot subsequently be changed, that is to say it is only possible to show system data from places in the code where provision was made for doing so back at the time of implementation.

Distributed applications in particular are distinguished by their size and complexity, as a consequence of which they can only be tested with difficulty if the normal devices are used. Such methods or systems are described in WO 2000/55733 A1, DE 43 23 787 A1, U.S. Pat. No. 5,790,858, EP 0 470 322 A1, U.S. Pat. No. 5,307,498 and U.S. Pat. No. 5,371,746 for example.

SUMMARY OF THE INVENTION

An object of an embodiment of the invention now resides in specifying a method or device by which at least one of the disadvantages set out above are avoided.

An embodiment of the invention creates a general capability to test or observe distributed parallel-running component-based software systems, which makes only minimal changes to the system to be observed, automatically provides inspection instruments to the correct system components, makes available a semantic assignment of communication messages between the transmitter and receiver concerned, and without having synchronized time on the individual components of the distributed system provides a logical event sequence in the form of an evaluation model, which can be used as the basis for any required type of evaluation tools.

BRIEF DESCRIPTION OF THE DRAWINGS

The present invention will become more fully understood from the detailed description of preferred embodiments given hereinbelow and the accompanying drawings, which are given by way of illustration only and thus are not limitative of the present invention, and wherein.

DETAILED DESCRIPTION OF THE PREFERRED EMBODIMENTS

Figure 1:
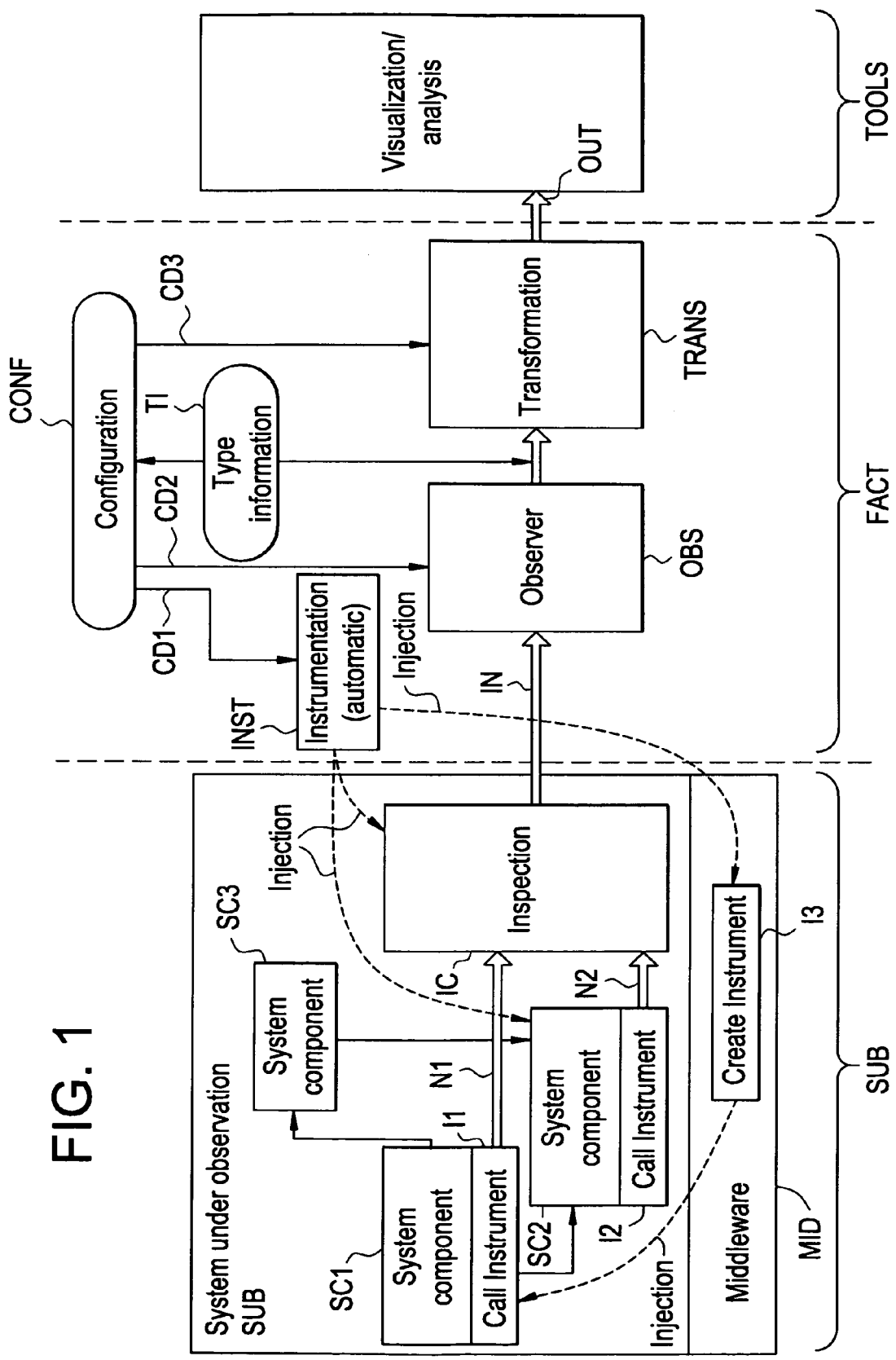
FIG. 1 a summary view to explain the method or device in accordance with an embodiment of the invention, as applicable, FIG. 2 a diagram to explain the automatic instrumentation, FIG. 3 a diagram to explain how the so-called call-instrumentation works, FIG. 4 a diagram to explain the abstract design of a model used in the method according to an embodiment of the invention, FIG. 5 a diagram to explain the application structure of this model, and FIG. 6 a diagram to explain the physical structure of this model.

FIG. 1 shows a framework program FACT, for automated component tracing, which receives its input information IN in the form of messages from a system SUB which is under observation, and which itself provides output information OUT, either online or offline, to visualization or analysis tools TOOLS. Depending on data from a configuration module CONF, an implantation or injection of inspection instruments I1 . . . I3 is effected with the help of an instrumentation module INST into system components SC1 and SC2, selected from among the system components SC1 ... SC3 on the basis of the configuration, or into a so-called item of middleware MID, which is described in more detail below. Optionally, an inspection component IC can also be implanted or injected into the system under observation, SUB.

The inspection instruments I1 and I2 in the system components SC1 and SC2 then supply their messages either directly or by making use of the inspection component IC, which then in turn supplies the messages IN for the framework program FACT. The framework program FACT has an observation part OBS, which collects the IN messages and from which, filtered in accordance with items of type information TI, which are also available to the configuration module, they are then passed to a transformation module TRANS, where they are then, depending on the configuration module, passed as OUT data for a general evaluation model to the tools TOOLS, for visualization or analysis. This division of the system into three parts should be seen as a purely logical structure, with no implications about the physical structuring across several participatory processes or devices.

The global sequence of activities of the framework program FACT breaks down essentially into two procedures:

a) The instrumentation: Taking into account the configuration data from the CONF module and the type information TI, the automatic instrumentation component or module, INST, implants the instruments I1, I2 or I3 in the system components SC1 and SC2 of the system SUB under observation. This procedure takes place as soon as a component is created, that is both when the system is started and also when any subsequent dynamic expansion of the system SUB takes place at run time.

b) The recording and forwarding of system information: Messages are generated in the inspection component IC and are forwarded to the observer OBS, which collects these messages and filters them depending on the configuration module or the type information, as applicable, before forwarding them to the transformation module. In the TRANS module, the type information TI is used to effect a conversion and forwarding to the visualization or analysis facilities.

The automatic instrumentation of application components in order to extract system data and of the documentation of dynamic system activity sequences is implemented by the combination and application of methods of system observation and enhancement which are in themselves common, but by comparison with other methods offers a range of advantages:

1. The instrumentation is effected at the system run time, that is to say the system design and system structure are not affected by it.

2. For any particular instrumentation, no new compilation of the program code is required, the method can also be applied as software supplied in release version form or on binary components supplied by other manufacturers.

3. All the relevant parts of a program can be instrumented, the essential point here being that components which are created at execution time can be automatically and retrospectively instrumented. This makes it possible to obtain a view of the entire system and not simply of the static parts, that is the parts which are known at the time of start-up. The scope of the instrumentation and the data which is to be captured can also be configured at the time of execution.

4. The instrumentation code is very compact and hence it can also be used for embedded systems with limited resources.

5. The execution of the instrumentation code is very efficient.

6. The behavior of the application is only slightly affected.

Figure 2:
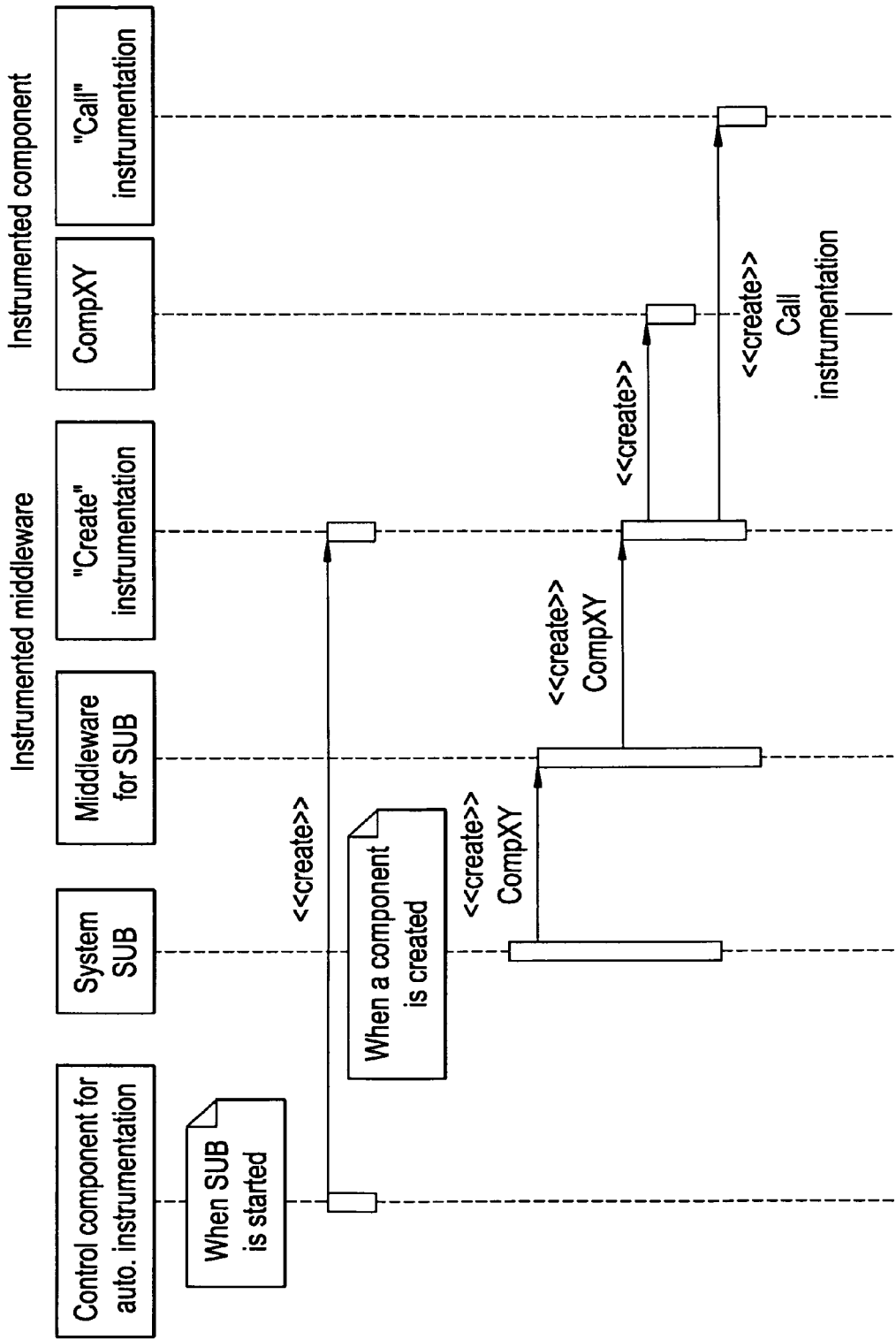
Figure 3:
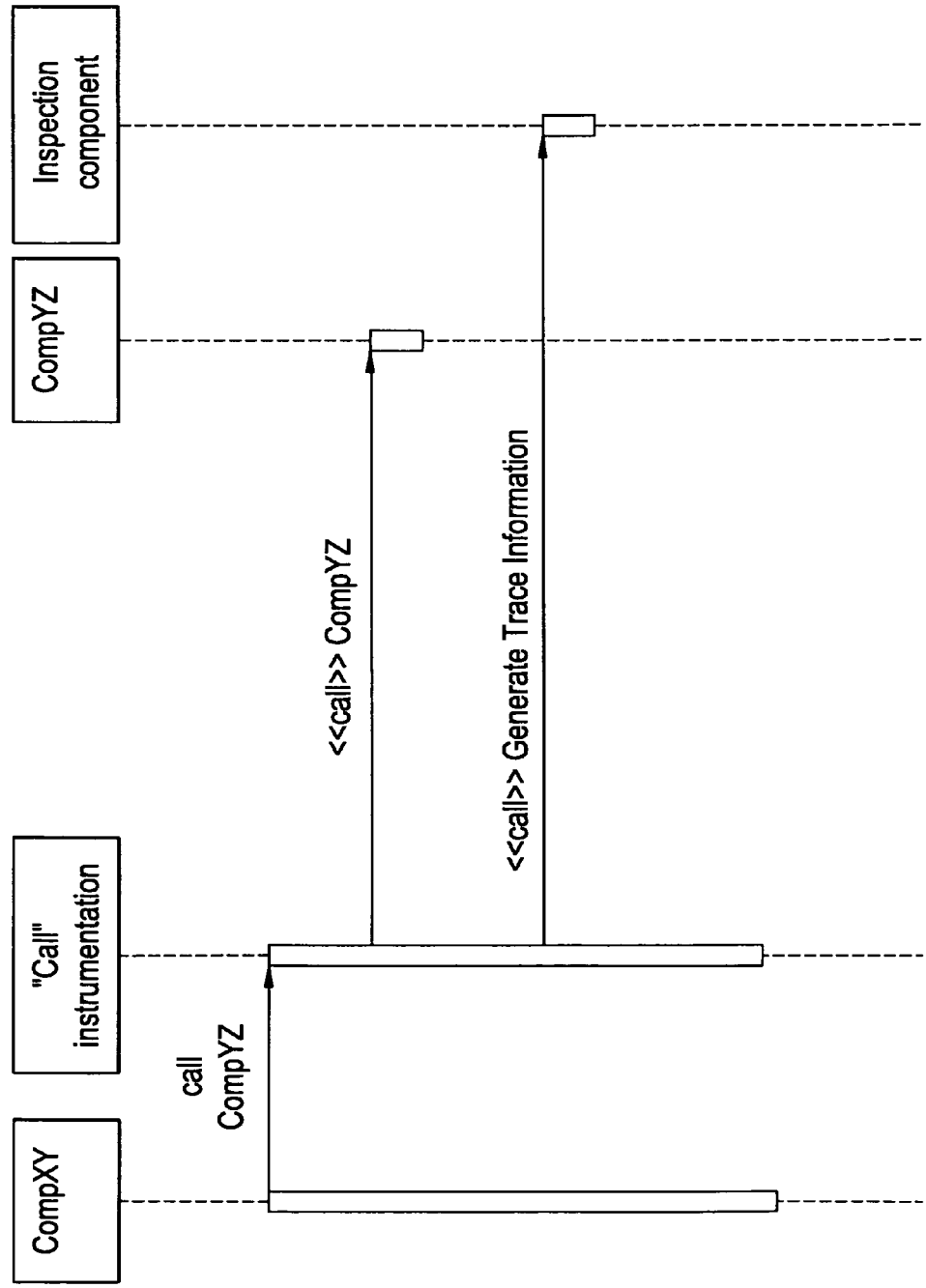

The INST module for automatic instrumentation is used at two points in time. First, when the system to be investigated, SUB, is started, whereby provision is made by the instrumentation of an item of so-called "Middleware" with the "Create" instrumentation I3 for ensuring that the framework program FACT is informed when a new component is created in the system SUB which is to be observed. Here, the middleware, MID, is to be regarded as a piece of software which mediates between an application and the network layer beneath it. The middleware exports its functionality via a defined program interface (API) and, for example, implements the interaction between parts of the application which are executed on devices within various platforms. The second point in time relates to the creation of a system component at some later point in time, while the system SUB is being executed. This involves the "Create" part of the instrumentation, I3, in implanting a "Call" instrumentation component I1 in the newly created component SC1, to monitor all the calls of this component. These relationships are clearly shown in FIGS. 2 and 3.

The instrumentation components I1, I2 and I3 are directly linked to the appropriate parts of the system, SC1, SC2 and MID, that is the system components or middleware, and form one unit. This does not alter any of the component interfaces, so that there are no effects on the overall system. The inspection component is implemented as a generic object, that is to say it receives data from various instrumented code locations. An advantage of this is that there is only one copy of the instrumentation code for each device, but it can be addressed from within different processes, which saves on memory space. The configuration module CONF enables a selection to be made of system components which are to record messages when the system observation information is being collected. This configuration module uses the type information TI, with which all the system components SC1 . . . SC3 can be uniquely identified, and which contains among other details readable names for the system elements. The instrumentation component compares the types of the system components with the planned data generation types, and decides on the instrumentation for each component. This ensures that the data generated is exclusively that which the user planned for it, and in addition prevents any possible overflow of buffer memories.

Within the framework program, the observation module OBS is responsible for collecting the raw data from the various inspection instruments, and for the selection or filtering, as applicable, of data to be passed on to transformation module. The configuration prescribes which items of data are to be selected or filtered. The configuration can be defined in advance or at the time of execution of the system. The observation module OBS can also be configured—independently of the configuration of the instrumentation—with respect to the components or objects to be traced, the contents of the trace and the depth of the trace, that is the level of detail of the system data which is collected.

The transformation module TRANS undertakes the task of processing and supplementing the raw data collected in the various parts of the system to be observed, SUB. The OUT data items are for a model, and are transferred to visualization/analysis tools via a defined interface. The model is chosen to be flexible, allowing a host of possible tools to be used. In the transformation module, the logical and communication interrelationships between the individual system elements are reproduced, the events are put into their correct time sequence, and static information about the types of the system components is added in order to give the data a structure and to make it readable by a person, for example by using names.

The following items of input data IN are required from the system under observation, SUB:

1. An identification of the components within the program unit together with the run time environment, that is to say the current process and the current thread. In general, these items of information can be queried using operating system functions, whereby a unique identification ID is provided for each device. Such an ID represents a unique identification for an object, and in most cases consists of an non-negative integer value.

2. Type information about the system elements which are to be observed, that is, about the components, objects, interfaces and global functions. The type information specifies the abstract structure of the system elements. It is specified at the point in time when the application is designed, and is generally available in a well-defined format. The framework program FACT itself does not absolutely require this information, but the tools TOOLS which are based on this framework program can use it to document the design structure and to implement a presentation which can be read by a person.

In detail, the following parts of the type information are relevant:

Names of the system elements or sometimes even just the unique identification numbers, the IDs.

For objects and interfaces: a list of methods and their signature, that is to say details of the parameters and return values for the method.

For components: a list of the interfaces for these components.

For interfaces: a list of the methods which the interface provides for, and their signatures.

In the case where system elements make use, by inheritance or aggregation, of implementations of other elements, which is provided for in the case of object-oriented programming languages, the structure of the inheritance/aggregation relationships is also required.

In addition, use is made of the following services of the system to be observed:

A listing of the modules which belong to an application or the identification of the components involved.

The injection of code blocks or libraries into external processes in order to effect the instrumentation.

Interception of system functions, in particular of functions which create objects or components, so that components which are generated during the execution time can also be monitored, and the interception of registration messages and method calls.

Some of these services are available from the operating system or are implemented in the FACT module by the use of familiar methods.

From the raw IN data, the transformation derives the following items of data for a model:

information about system elements, categorized by various aspects: relating to the abstract design, the application structure and the physical run time structure, information about the system structure, that is the relationships of the system elements to each other, such as for example the association of processes with devices, where this association is not static but may change over the duration of the execution time, items of data which specify the life-cycle of the system elements, information about local and distributed communication activities and events, items of data which specify the interrelationships between communicating system elements together with the logical sequence of events, without this requiring synchronized clocks, and items of data which permit the unambiguous identification of system elements, legible to a person, i.e. plain text names and not merely internal IDs.

For this purpose, the FACT module generates system-wide unique IDs for the individual system elements and for the individual communication activity sequences, which are appended to the system messages concerned.

For a good many system elements, IDs are already issued by the operating system. However, these are only locally unique, typically for a program unit or for a device. The transformation component combines different local IDs into a system-wide unique ID for each system element, or itself issues unique IDs. This makes system-wide identification possible.

When new system elements are created, either at the time of start-up or at the time of execution, the type information and information relating to the run time environment are used to reproduce in addition the relationships between the different system elements. From these items of data it is possible to infer the run time structure of the distributed system.

The items of data generated by the instrumentation to document an individual sequence of communication activities have a logical interdependence which is not, however, directly contained in the data which has been collected. The method adds the appropriate dependencies to this data.

For this purpose, a unique ID is generated for each individual communication. Every event which is part of this sequence of communication activities contains this ID. This makes the following possible:

a semantic assignment of the communication messages from the transmitter(s) to those of the receiver, and the determination of the logical sequence of events without synchronization of the time on the individual nodes of the distributed system The output interface with the OUT signals is based on a data model of the system messages created by the inspection component.

The model itself can be broken down into several logical parts, which specify different aspects of the SUB, or define different views of the system:

the abstract design, the application structure at the time of execution, and the physical structure.

The abstract design of a distributed application is laid down at a very early stage of development, and is static. It is not traced by the instrumentation, but instead is deduced from the type information. These items of data are regarded as part of this model because tools, which are based on them, can use them for identification by means of names which can be read by a person, for structuring and for filtering the system elements.

Figure 4:
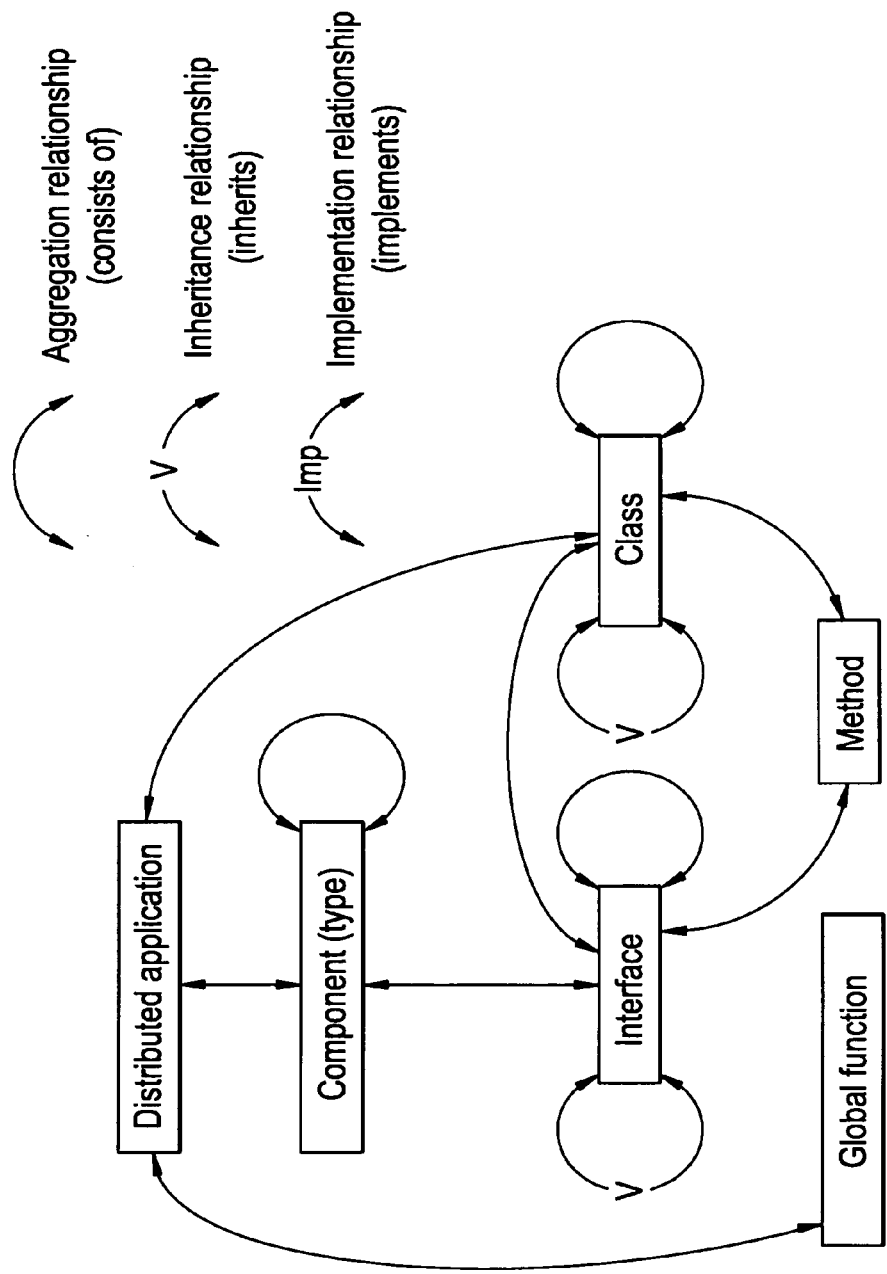

FIG. 4 shows the structure of the model, in which the relationships between the distributed application, the component, the interface, the class, the method and the global function are defined using aggregation, inheritance and implementation relationships. For example, components and classes can be aggregated or nested, as appropriate, or can have an inheritance relationship to one another.

Figure 5:
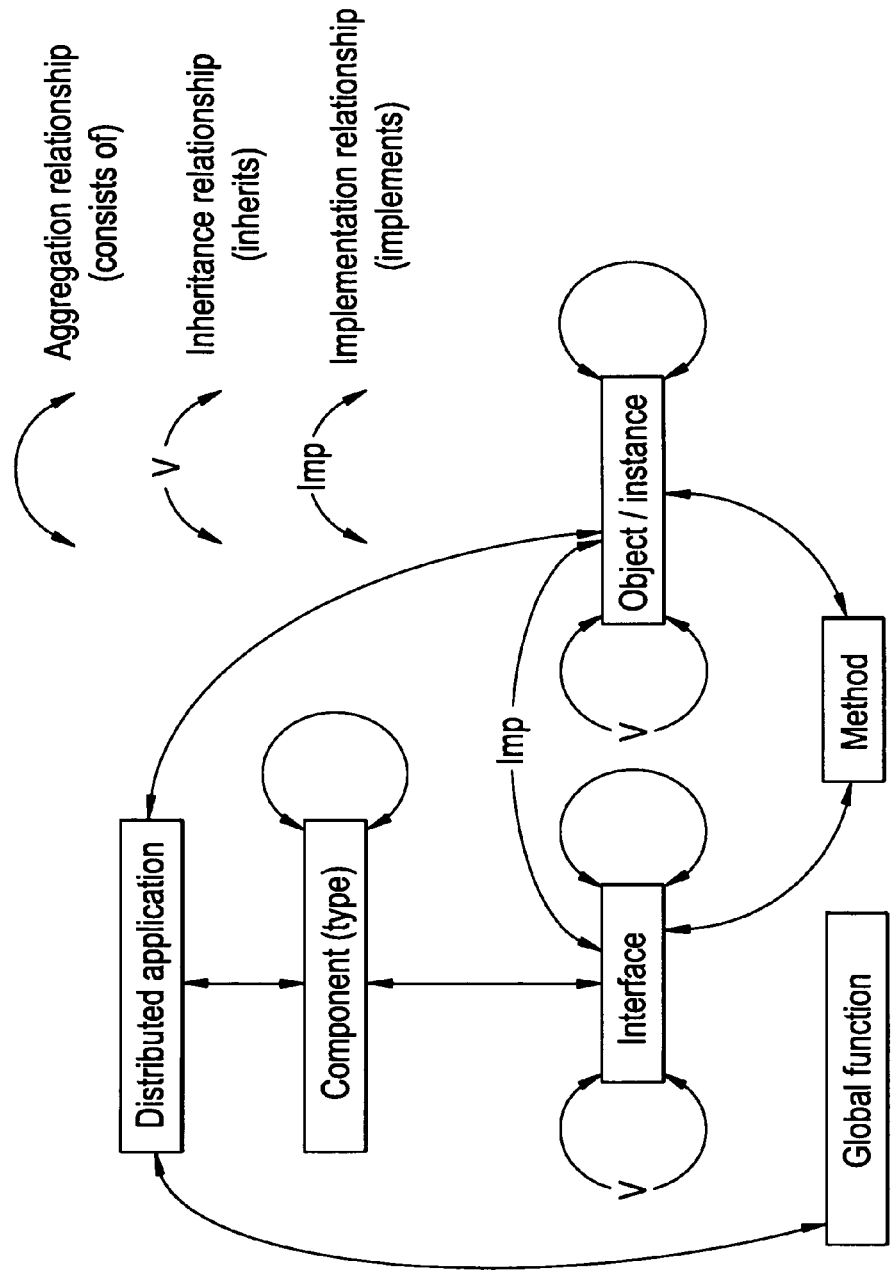

The application structure is shown in FIG. 5 and—unlike the abstract design—specifies the concrete instances of a distributed application which has been created or deleted during a special program run.

Figure 6:
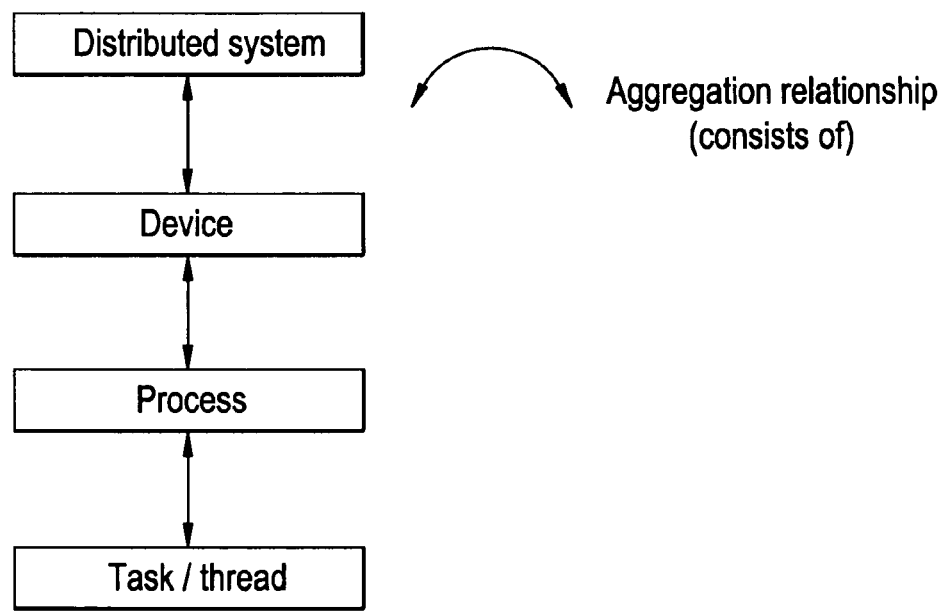

The physical structure is shown in FIG. 6, and specifies the run time environment of the distributed system, and breaks down as follows:

distributed system, device, process and task/thread.

The model defines the following types of system events, which are generated by the inspection component:

Communication events: send/receive
Registration events: create/destroy
Local events: pass
Periodic events: periodic update All events contain a timestamp, that is the local device time, their type, and a reference to the system elements involved. In the case of a communication event, there are always two of these, for a registration event, local event or periodic event there is one in each case.

Communication events are used to describe the following operations:

"send": can be an outgoing method call (send call), an outgoing data transfer (send message), or an outgoing return value (send return)
"receive": can be an incoming method call (receive call), an incoming data transfer (receive message), or an incoming return value (receive return)

Examples of registration events are:

"new": documents the creation/setting up of a new component or an object by another system element. When they are being created, there is generally also a communication (data exchange) between the components concerned, similar to the communication event "send".
"delete": documents the deletion of a component or of an object by another system element.
"create": is a special form of the event new. It documents the creation/setting up of a new component or an object, but without reproducing the relationship to the creating element.
"destroy": documents the deletion of a component or an object by itself Local events (pass) are events which are generated when a particular place in the code is reached. They can document the processing of particular sections of code or can also contain internal data, e.g. the content of local variables.

Periodic events (periodic update) are useful in that they can be used to monitor system variables, or other quantities defined by the user, at periodic intervals.

The method in accordance with the invention and the device in accordance with the invention can basically be used in all MW-based distributed systems, such as COM, CORBA, EJB, which satisfy the requirements set out above in relation to the system SUB which is to be observed.

An implementation exists for various Windows™ systems, including Windows CE™ and COM™. The method for instrumentation, for example, is based on methods currently used under Windows™/COM™, such as:

1. Delegation of method calls,
2. Loading of dynamically downloadable libraries (DLLs) into external processes or processes which are already being executed
3. Redirection of Win32 API functions.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for the automatic capture and recording of system data and activities in a distributed and parallel-running component-based software system, comprising:
    inserting at least one inspection instrument during a time of execution of the system, taking into account items of configuration data and type information, into at least one component of a system which is to be observed;
    generating messages, about the system to be observed, in the at least one component with the at least one inspection instrument at the time of execution;
    collecting the messages;
    filtering the messages in a way dependent on the configuration data; and
    transforming the collected messages into data for a universal evaluation model in such a way as to reproduce logical and communication interrelationships between individual system components, to order system events within the system under observation into their correct time sequence, and to append static type information to the system data.

2. The method of claim 1, wherein, when the system is started up, the at least one inspection instrument, in the form of a create instrument, is created only in an item of middleware, the middleware representing an item of software between an application and an underlying network layer, and wherein at least one inspection instrument in the form of a call instrument is inserted into at least one system component.

3. The method of claim 2, wherein the at least one inspection instrument supplies to an inspection component messages containing instrumentation code, which is addressed by several processes, and which supplies the messages for the system under observation.

4. The method of claim 1, wherein the at least one inspection instrument supplies to an inspection component messages containing instrumentation code, which is addressed by several processes, and which supplies the messages for the system under observation.

5. A tangible computer readable storage medium encoded with a computer program for the automatic capture and recording of system data and activities in a distributed and parallel-running component-based software system, comprising:
    a configuration module, adapted to make a selection of system components, depending on an item of type information, wherein at least one inspection instrument is insertable during a time of execution of the system into at least one of the components;
    an observation module, adapted to collect messages from the inspection instrument, selected in the configuration module;
    a transformation module, adapted to compile, from the messages from the inspection instruments, the data for at least one universal evaluation module, by the reproduction of logical and communication interrelationships for the messages, by ordering system events into their correct time sequence, and by appending static type information.

6. The tangible computer readable storage medium of claim 5, further comprising:
    an instrumentation module, adapted to create at least one inspection instrument, in the form of a create instrument, only in an item of middleware, where the middleware represents an item of software between an application and a network layer, and wherein at least one inspection instrument in the form of a call instrument is inserted into at least one system component.

7. A method for the capture and recording of system data and activities in a distributed and parallel-running component-based software system, comprising:
inserting at least one inspection instrument during a time of execution of the system into at least one component of a system to be observed;
generating messages, about the system to be observed, in the at least one component with the at least one inspection instrument at the time of execution; and
transforming the messages into data for a universal evaluation model so as to reproduce logical and communication interrelationships between individual system components, to order system events within the system under observation into a correct time sequence, and to append static type information to the system data.

8. The method of claim 7, wherein, when the system is started up, the at least one inspection instrument, in the form of a create instrument, is created only in an item of middleware, the middleware representing an item of software between an application and an underlying network layer, and wherein at least one inspection instrument in the form of a call instrument is inserted into at least one system component.

9. The method of claim 8, wherein the at least one inspection instrument supplies to an inspection component messages containing instrumentation code, which is addressed by several processes, and which supplies the messages for the system under observation.

10. The method of claim 7, wherein the at least one inspection instrument supplies to an inspection component messages containing instrumentation code, which is addressed by several processes, and which supplies the messages for the system under observation.

11. A tangible computer readable storage medium encoded with a computer program for the capture and recording of system data and activities in a distributed and parallel-running component-based software system, comprising:
means for inserting at least one inspection instrument during a time of execution of the system into at least one component of a system to be observed;
means for generating messages, about the system to be observed, in the at least one component with the at least one inspection instrument at the time of execution; and
means for transforming the messages into data for a universal evaluation model so as to reproduce logical and communication interrelationships between individual system components, to order system events within the system under observation into a correct time sequence, and to append static type information to the system data.

12. The tangible computer readable storage medium of claim 11, wherein, when the system is started up, the at least one inspection instrument, in the form of a create instrument, is created only in an item of middleware, the middleware representing an item of software between an application and an underlying network layer, and wherein at least one inspection instrument in the form of a call instrument is inserted into at least one system component.

13. The tangible computer readable storage medium of claim 11, wherein the at least one inspection instrument supplies to an inspection component messages containing instrumentation code, which is addressed by several processes, and which supplies the messages for the system under observation.

14. The tangible computer readable storage medium of claim 12, wherein the at least one inspection instrument supplies to an inspection component messages containing instrumentation code, which is addressed by several processes, and which supplies the messages for the system under observation.

* * * * *